Patented Aug. 19, 1941

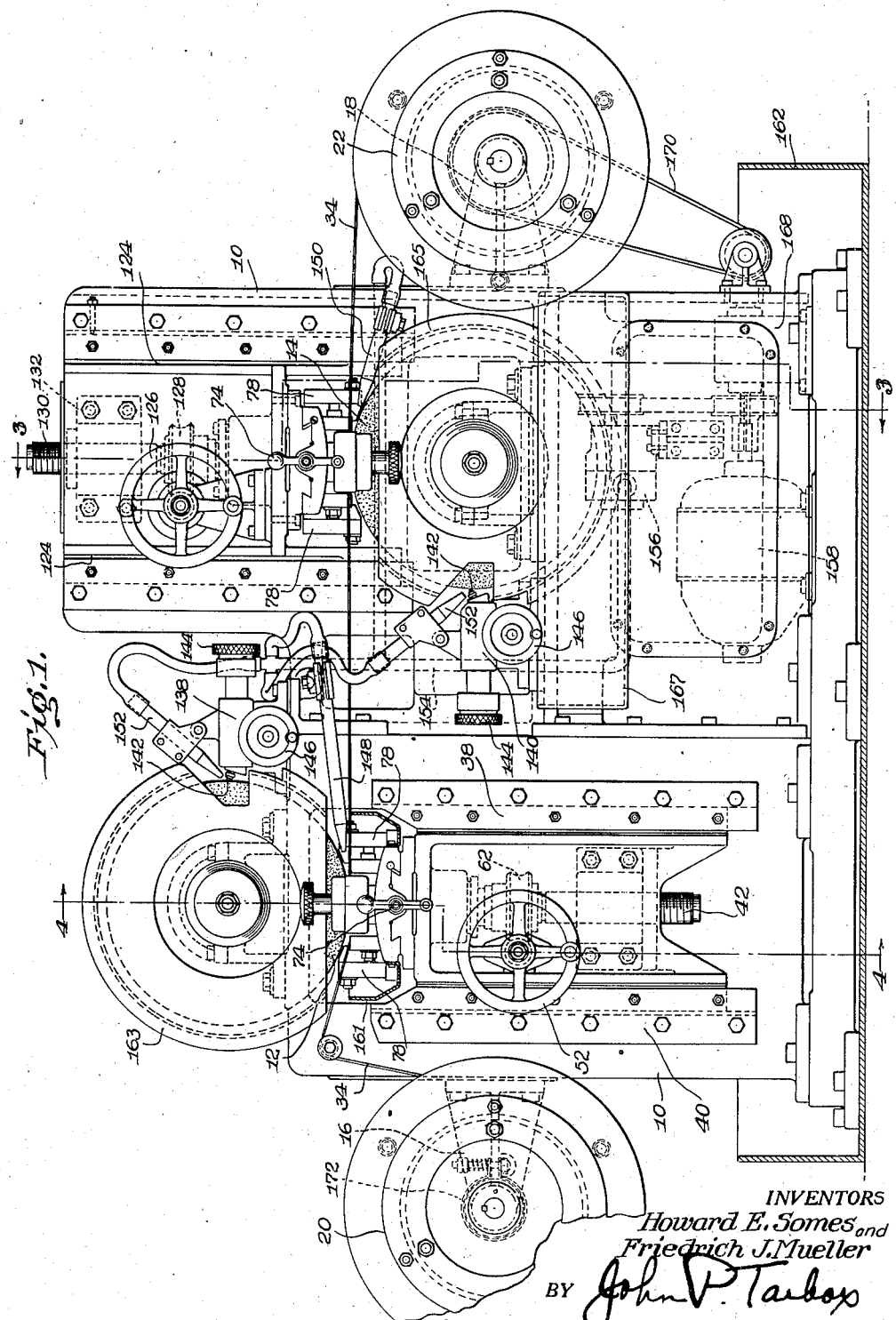

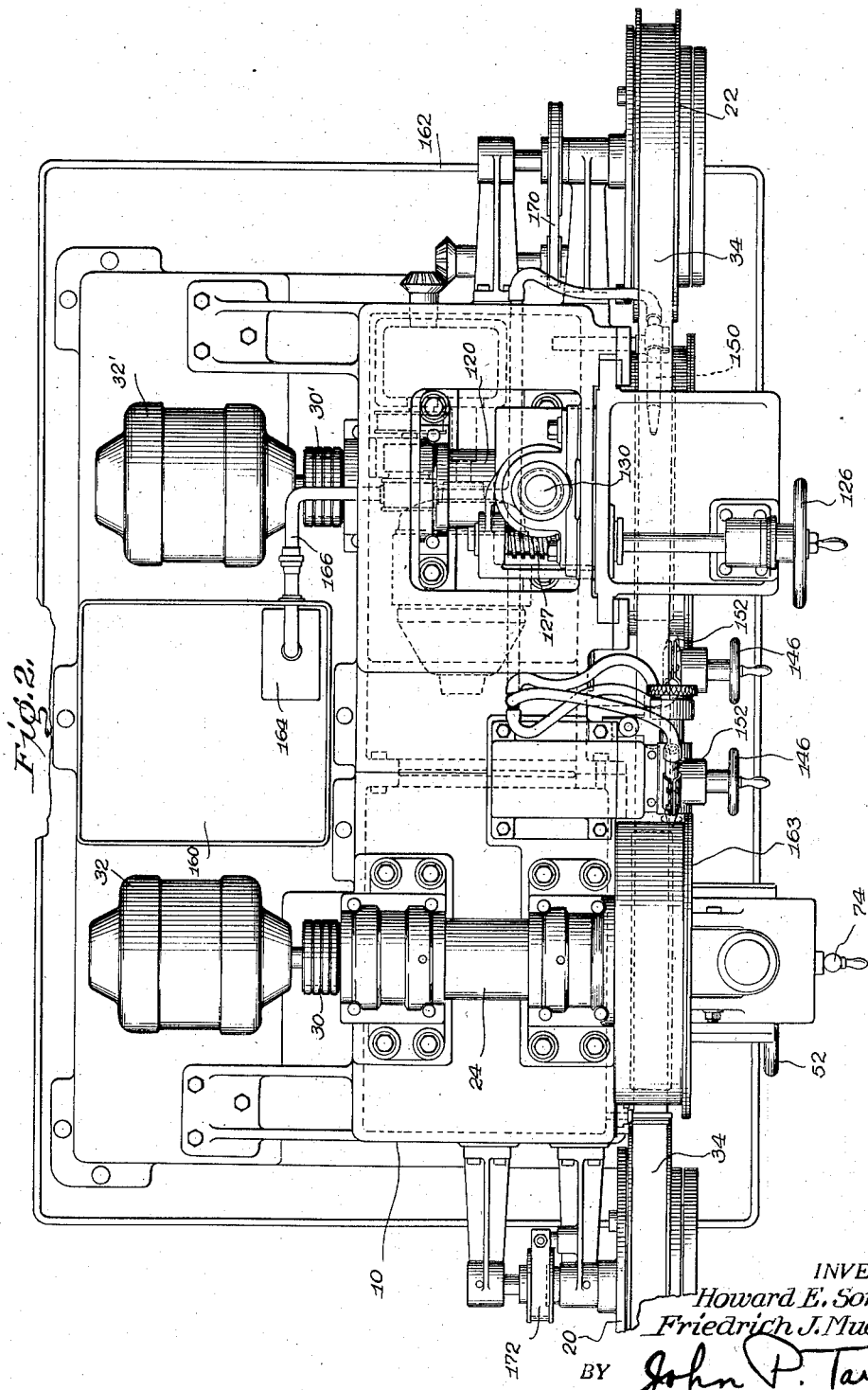

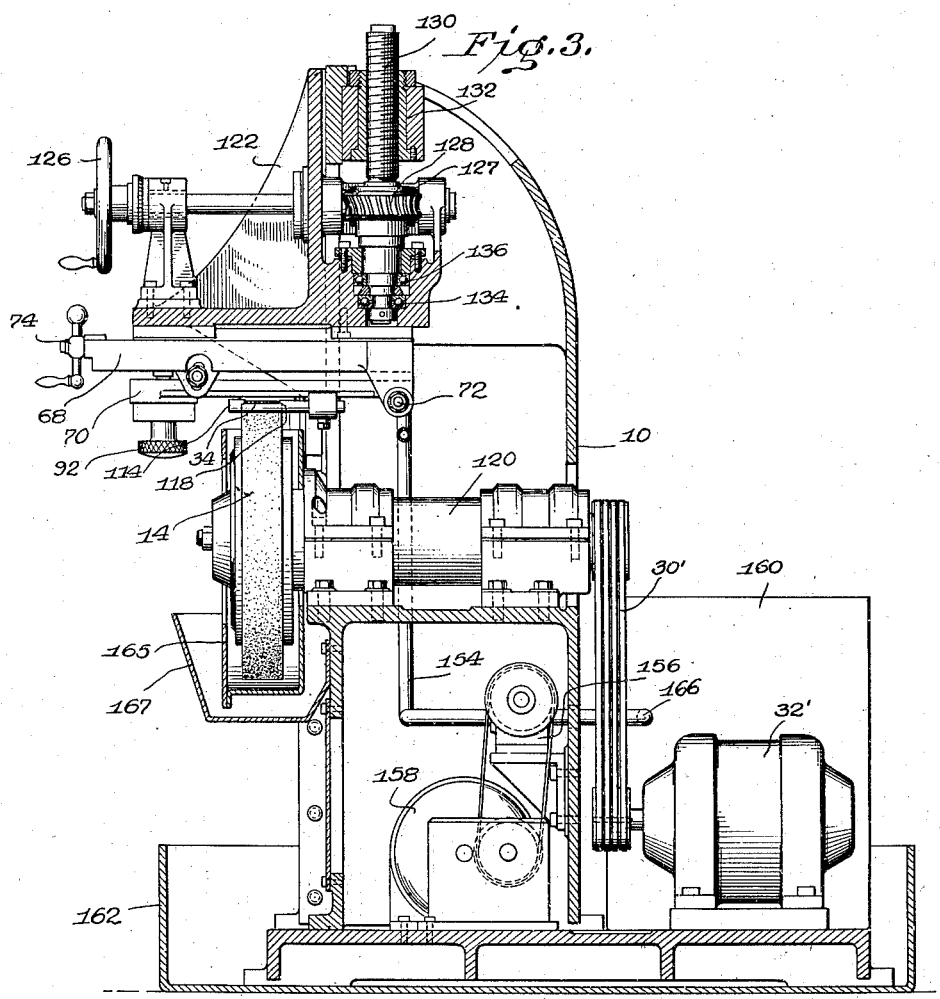
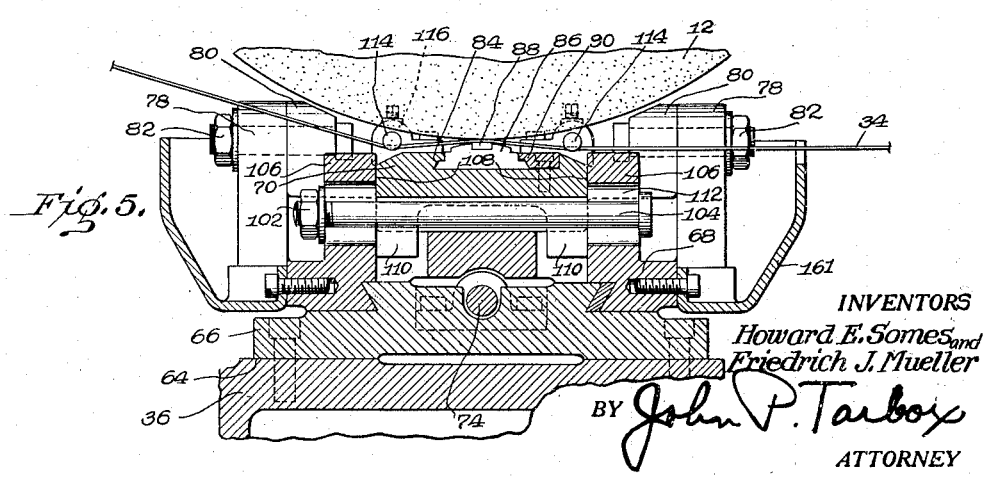

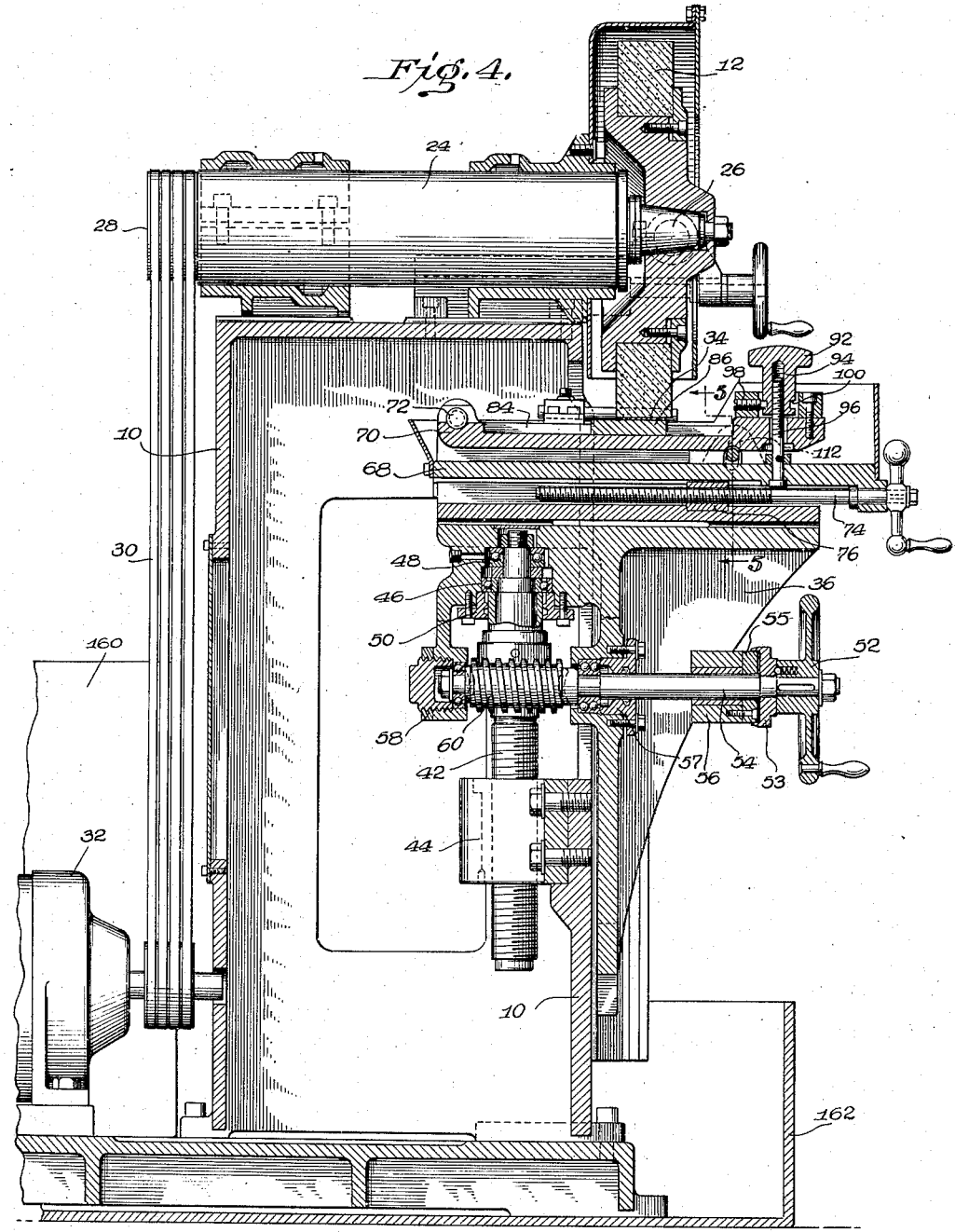

2,252,818

UNITED STATES PATENT OFFICE 2,252,818

GRINDING MACHINE

Howard E. Somes and Friedrich J. Mueller, Detroit, Mich.

Application July 31, 1940, Serial No. 348,750

13 Claims. (Cl. 51—75)

This invention relates to a cutting or grinding machine of the type adapted to shape stock fed continuously therethrough and is especially adapted to the shaping of such stock such that opposite surfaces will be plane and in any desired angular relation with respect to each other. The machine has been particularly useful in shaping thin iron laminations for transformers in which the core is in the form of an annulus and the individual laminations are in the form of thin radial sectors, this latter shape being essential where a maximum amount of iron is to be built into an annular transformer core with a minimum of waste space.

The present machine is adapted to cut flat strip stock fed continuously through the machine so as to produce thin wedge section stock which may have accurate plane surfaces and the cross section of which stock may remain the same. The apparatus is especially constructed so as to rigidly adhere to such adjustments as are made for finishing the surfaces of such flat stock and is so arranged as to be readily adjustable to cut any desired cross section.

Accordingly, it is an object of the present invention to provide a rugged readily adjustable machine for cutting or grinding strip stock of uniform cross section along its length.

Another object of the invention is to provide an apparatus in which strip stock of rectangular cross section is fed continuously therethrough and in which either surface thereof or both may be ground at an angle to one another to provide a strip of fixed sector cross section, the machine being particularly adapted for quick adjustment, accurate truing of the cutting or grinding wheel as well as being adapted to feed cutting fluid continuously to the cutting or grinding area during operation thereof.

A still further object of the invention is to provide feeding mechanism for drawing stock continuously through such a grinding and cutting apparatus.

The above and other objects and novel features of tthe invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein like reference numerals indicate like parts:

Figure 1 is a side elevation of the grinding or cutting apparatus, certain invisible parts thereof being indicated to show their location.

Figure 2 is a top plan view of the grinding machine, certain invisible parts thereof being indicated to show their location.

Figure 3 is a transverse vertical section taken substantially on the line at 3—3 of Figure 1.

Figure 4 is a transverse vertical section taken substantially on the line 4—4 of Figure 1 and Figure 5 is an enlarged sectional view of a portion of the cutting wheel and strip guiding mechanism taken substantially on the line 5—5 of Figure 4.

Referring to the drawings and particularly Figure 1, there is illustrated a main support member 10 carrying cutting or grinding wheels 12 and 14, each of which is illustrated as being of the abrasive cylindrical grinding face type. At each end of the machine is provided a bracket 16 and 18 carrying stock reels 20 and 22 from which thin strip stock is initially fed and thereafter rereeled. Each of the grinding wheels and the mechanism for guiding the strip material thereagainst in a highly accurate manner is similar in many respects with the exception that one is inverted and adapted to operate upon an opposite side of the strip material from that upon which the other is adapted to operate. Referring to Figure 4 which illustrates the grinding wheel adapted to operate upon the top surface of the strip, there is illustrated a main bearing assembly 24 housing the shaft 26 carrying the grinding wheel 12, the shaft 26 being driven by a pulley 28, belt drive 30 and suitable motor 32. The grinding wheel, as is illustrated, is rigidly secured upon the frame 10 in a rigid manner and the main bearing assembly 24 is such as to provide an accurate bearing for the wheel throughout its life, the bearing being of a type especially protected from entrance of abrasive or foreign matter which would be likely to cause unusual wear and loss of accurate centering.

To accurately guide strip material, indicated at 34 in elevation in Figure 1, and illustrated in engagement with the lower peripheral portion of the grinding wheel 12 in Figure 4, an adjustable but otherwise rigidly supported mechanism is provided. For example, a main bracket member 36 is vertically slidably mounted upon ways 38 and 40 rigidly carried upon the vertical front face of the frame 10 and the bracket is elevatable to any desired height through a heavy feed screw 42 carried by the bracket and threaded into a stationary threaded block 44 arranged upon the back side of the front face of the frame 10. The screw 42 is provided at its upper end with a suitable pilot bearing 46 and an end thrust bearing 48 so that lateral and axial motion with respect to the bracket is prevented and the bearings are protected from the entrance of abrasive or foreign matter through a packing gland 50 arranged upon the underside of the bearings 46 and 48. Rotation of the screw is effected through a hand wheel 52 carried upon a shaft 54 journaled in fore and after bearings 56 and 58 and central bearing 57 carried by the bracket 36, the shaft 54 carrying a worm wheel 60 which in turn engages a worm wheel 62 (see Figure 1) secured upon the feed screw 42.

The bracket 36 is provided on its top with a substantially horizontal face 64 upon which is mounted a horizontal guide or way 66 preferably extending substantially parallel with the axis of the abrasive wheel shaft 26. Slidable fore and aft upon the way 66 are a pair of guide members 68 and 70 hinged together at one end about a center 72. The lower member 68, which is slidable upon the way 66 is provided with a fore and aft adjusting hand screw 74 threaded into a sleeve 76 carried by the way 66. The members 68 and 70 are provided with ears 78 and 80 through which pivot pins 82 extend to provide the pivotal motion between the members 68 and 70 about the axis 72.

The member 70 is provided with a way 84 in which is adjustably positioned a stock rest 86, the latter being provided with a hardened central face member 88 immediately beneath the wheel 12 in order to support the strip material 34 rigidly against the face of the grind wheel. The rest 86 is adjustably positioned in the way 84 and may be locked in any desired place by drawing a complemental portion 90 of the way 84 tight against the rest 86.

In order to change the angular relation between the hinged members 68 and 70 to any desired degree and to accurately and positively secure them in the chosen angular relation, a hand wheel 92 having an internally threaded bore 94 and cooperating threaded pin 96 is provided, the pin 96 being secured to the member 68 substantially perpendicular thereto, and the hand wheel 92 being swively mounted with respect to the member 70 and held against axial movement with respect thereto through a set screw 98 cooperating with a groove 100 in the shank of the hand wheel 92. Locking of the members 68 and 70 in any desired position is effected by tightening a nut 102 upon a bolt 104 extending between upstanding ears 106 upon the member 68, the ears being adapted to engage the sides 108 of the member 70 and thereby rigidly clamp the members 68 and 70 against relative movement. In order to broaden the bearing surface between the sides 108 of the member 70 and the ears 106 of the member 68, the member 70 is provided with bifurcated depending ears 110 arranged about the bolt 104 and to provide a suitable range of adjustment, the apertures in the ears 106 through which the bolt 104 extends are vertically slotted as indicated at 112.

In order to guide the strip material 34 across the hardened block 88, which may for the purpose be made of Carboloy, suitable pins 114 mounted upon brackets 116 secured to the upper face of the member 70 are provided, the pins being grooved as is indicated particularly in Figure 3 at 118 to fix the strip material against lateral movement parallel with the axis of the grind wheel or toward or away from the pivotal axis 72 between the hinged members 70 and 68. The contact surface of the block 88 which extends through a vertical plane passing through the axis of the grind wheel 12, in practice, is preferably so arranged as to extend through the axis 72 of the hinged members 70 and 68 and in order to grind the strip material 34 to a proper segmental shape the bracket 36 and the members supported thereon are vertically adjusted so that the pivotal axis 72 is tangential to an imaginary cylindrical extension of the peripheral cylindrical grinding surface of the grinding wheel 12. By so adjusting the position of the pivot 72 with respect to the grinding wheel the selected angle between the members 70 and 68 will effect grinding of strip stock fed therethrough accurately so that the stock emerging therefrom will have a sector shape suitable for assembly, for example, in a transformer ring core having an internal radius equal to the distance from the pivotal axis 72 and the adjacent edge of the strip stock 34 as it passes beneath the grinding wheel 12.

In practice, where it is preferable to grind both faces of the strip stock, a second grinding wheel 14 is provided which may have its strip guiding apparatus so adjusted as to merely polish the under-surface of the strip stock or it may be so adjusted as to additionally cut the strip stock to a new sector cross section corresponding to the final desired cross section. In practice, however, either wheel may be employed without the other if a single grinding operation is sufficient and the initial opposed face of the strip material is sufficiently smooth to serve for the purposes desired.

The second grinding wheel 14 is carried in a bearing 120 identical to that provided for the wheel 12. In this instance, as is illustrated in Figure 3, the bearing 120 is positioned in an aperture in the frame 10 and the work support is arranged thereabove. The grinding wheel 14 is driven through a belt drive 30' by a motor 32'. As in the previous arrangement, the work support comprises a bracket 122 vertically slidable upon ways 124 and its vertical position is adjustable through the operation of the hand wheel 126 acting upon the worm and worm wheel 127 and 128, respectively, arranged on the vertical adjustment screw 130. The vertical adjustment screw acts upon the threaded block 132 secured to the bracket 122 and is piloted in fixed position in the bracket through the thrust bearing 134 and the bearing 136.

Insofar as the stock guide in conjunction with this wheel is concerned, the structure is substantially identical to the guide described in conjunction with the abrasive wheel 12 and similar reference characters are, therefore, applied to these parts although inverted.

In order to assure a true cylindrical grinding face upon the wheels 12 and 14, truing or dressing devices 138 and 140 are provided in conjunction with each wheel. Each device includes a diamond cutting point 142 which is adjustable toward and away from the wheel through the manual screw adjustment 144 and its carriage is adjustable in a direction parallel to the axis of the wheel through the screw adjustment 146.

To aid in the grinding operation as well as to flush away the abraded material, suitable jets are provided in conjunction with each wheel through which a cutting fluid is supplied. For example, in conjunction with the grinding wheel 12 the jet 148 is provided and in conjunction with the grinding wheel 14 there is provided the jet 150, each jet being supported from the frame 10 in any suitable manner for example as illustrated. There are similarly provided jets 152 in conjunction with the diamond cutting points 142. All of these jets are supplied from a common distributing conduit 154 connected to a pump 156 driven from the motor 158 and through suitable valves not shown, any of the jets may be cut off. The cutting fluid so supplied is drawn into the pump 156 from a supply tank 160.

The entire apparatus is so arranged with various shields and guards so that the cutting fluid emitted from the various jets is prevented from being unduly thrown by the rapidly rotating abrasive wheels and the entire machine is positioned in a floor pan 162 into which the spent fluid finally gravitates from the various guards such as for example the guard or baffle 161 around the guide block supporting members 68 and 70, the guards 163 and 165 around the abrasive wheels 12 and 14, and the catch trough 167 underneath the wheel 14. From the floor pan the fluid is filtered in a manner well understood in the art in order to remove abrasive materials and thereafter returned to the tank 160 from whence it is again pumped to the various jets. If desired, in order to further assure of the removal of abrasive material a filter 164 may be provided directly in the suction line 166 of the pump.

The motor 158 is also adapted to drive the reel 22 through a gear reduction box 168 and the belt drive 170, and in order to maintain the strip material taut as it passes through the cutting apparatus, the reel 20 from which the strip material is fed is provided with a friction brake 172.

In practice, as has been briefly explained heretofore, it is desirable to so adjust the guide block 68 with respect to the grinding wheel so that the under-surface of the strip material (for example as it is fed against the abrasive wheel 12) lies in a plane passing through the axis 72 and such that the ground face on the top side of the strip material likewise lies in a plane passing through the same axis. When the machine is so adjusted, it is merely necessary to position the axis 72 with respect to the shouldered guide pins 114 a distance equal to the radius of the sector shape of strip material which is to be cut, and this radius may be varied quickly to grind other shapes provided the way 66 is parallel with the axis of the abrasive wheel shaft 26, by simply sliding the hinged guide support members 68 and 70 through manipulation of the hand screw 74. It will be observed that the diameter of the grinding wheel is relatively great and that consequently the wear thereon is extremely gradual so that trimming of the wheel through the use of the diamond 142 will not be required except after extended use. Thus once the apparatus is adjusted it need merely be checked at such intervals as are found to be desirable for accuracy. Thereafter, if the wheel is found to require redressing the extent of redressing required as may be ascertained by the required adjustment of the diamond 142 may be thereafter promptly compensated for by a similar vertical adjustment of the bracket 36 through actuation of the hand wheel 52 and the elevating screw 42. In practice, indicators may be employed in conjunction with the various adjustments, it appearing that with the dressing of one of the wheels by a specific amount, it would be merely necessary to move the main bracket toward the wheel by an equivalent amount and thus by providing such indicators, such compensations for wear may be very quickly effected. Instead of indicators it may only be necessary to know the extent of adjustment, for example with respect to the diamond dressing tool per turn of the adjusting knob 144 and effecting corresponding adjustment through the hand wheel 52. The latter may be provided with a settable indicating drum 53 cooperating with a stationary indicator 55 arranged in conjunction with the bearing support 56 of the wheel shaft 54. Adjustment as to the speed of moving the strip material through the machine may be made by a selection of a proper reduction gear 168 or by employing an adjustable speed motor 158. In order that the strip material may be fed through at a uniform rate and wound upon the reel 22 uniformly, it is preferable that the reel be of relatively large diameter so that successive thicknesses or turns of strip material wound thereon will not materially alter the speed at which the strip material is drawn through the apparatus. It will be appreciated also that because of the accuracy required in the machine the various ways will be preferably provided with wear strips effecting close fit and a minimum of lost motion as illustrated and as will be well understood in the art.

Though a single embodiment of the invention has been illustrated and described, it is to be understood that the invention is not limited thereto but may be embodied in various mechanical arrangements. As such changes in the construction and form of the parts may be made without departing from the spirit of the invention, as will be apparent to those skilled in the art, reference will be had to the appended claims for a definition of the limits of the invention.

This invention is an improvement on that shown and described in the co-pending application of Howard E. Somes, Serial No. 266,912, filed April 8, 1939, for Grinding machine, in which some of the broader aspects of the machine of this invention are claimed.

What is claimed is:

1. In an apparatus of the class described, a support, a rotatable shaft having a peripheral concentric cutting means thereon, a work bracket adjustably mounted on said support, and movable toward and away from said cutting means, a work guide comprising hinged members, one being slidable on said bracket and the other having a work rest adapted to hold the work against said cutting means, and means for adjusting the hinged relation of said members to vary the angle of said work rest with respect to the cutting means.

2. In an apparatus of the class described, a support, a rotatable shaft having a peripheral concentric cutting means thereon, a work bracket adjustably mounted on said support, and movable toward and away from said cutting means, a work guide comprising hinged members, one being slidable on said bracket and the other having a work rest adapted to hold the work against said cutting means, means for adjusting the hinged relation of said members to vary the angle of said work rest with respect to the cutting means, and a work guide adjacent said work rest to fix the position of a workpiece transversely with respect to the plane of said peripheral cutting means.

3. In an apparatus of the class described, a support, a rotatable shaft carried thereby, a grinding wheel having a substantially cylindrical grinding face concentrically arranged on said shaft, a work bracket slidably arranged upon said support, and adapted to move toward and away from said shaft and wheel, a work guide comprising hinged members, one being slidable on said bracket substantially parallel with the axis of said wheel, and the other having a hardened work guide thereon, said members being hinged about an axis substantially transverse to the axis of said wheel and the movement of said bracket toward and away from said wheel, and means for adjusting the angle between said members.

4. In an apparatus of the class described, a support, a rotatable shaft carried thereby, a grinding wheel having a substantially cylindrical grinding face concentrically arranged on said shaft, a work bracket slidably arranged upon said support, and adapted to move toward and away from said shaft and wheel, a work guide comprising hinged members, one being slidable on said bracket substantially parallel with the axis of said wheel, and the other having a hardened work guide thereon, said members being hinged about an axis substantially transverse to the axis of said wheel and the movement of said bracket toward and away from said wheel, means for adjusting the angle between said members, and means carried by said work guide carrying member for securing a workpiece against movement transverse to the plane of said wheel.

5. In an apparatus of the class described, a support, a rotatable shaft having a peripheral concentric cutting means thereon, a work bracket adjustably mounted on said support, and movable toward and away from said cutting means, a work guide comprising hinged members, one being slidable on said bracket and the other having a work rest adapted to hold the work against said cutting means, means for adjusting the hinged relation of said members to vary the angle of said work rest with respect to the cutting means, a pair of strip stock reels rotatably mounted on said support, and a brake for resisting the rotation of one, and power means for rotating the other.

6. In an apparatus of the class described, a support, a rotatable shaft having a peripheral concentric cutting means thereon, a work bracket adjustably mounted on said support, and movable toward and away from said cutting means, a work guide comprising hinged members, one being slidable on said bracket and the other having a work rest adapted to hold the work against said cutting means, means for adjusting the hinged relation of said members to vary the angle of said work rest with respect to the cutting means, and a work guide adjacent said work rest to fix the position of a work piece transversely with respect to the plane of said peripheral cutting means, a pair of strip stock reels on said support, and means for guiding strip material from one across said work guide and rest and to the other.

7. In an apparatus of the class described, a support, a rotatable shaft carried thereby, a grinding wheel having a substantially cylindrical grinding face concentrically arranged on said shaft, a work bracket slidably arranged upon said support, and adapted to move toward and away from said shaft and wheel, a work guide comprising hinged members, one being slidable on said bracket substantially parallel with the axis of said wheel, and the other having a hardened work guide thereon, said members being hinged about an axis substantially transverse to the axis of said wheel and the movement of said bracket toward and away from said wheel, and means for adjusting the angle between said members, means for supplying cutting fluid to said grinding wheel adjacent said work guide, means for catching cutting fluid discharged therefrom, filtering and again delivering the fluid to said supplying means.

8. In an apparatus of the class described, a support, a rotatable shaft carried thereby, a grinding wheel having a substantially cylindrical grinding face concentrically arranged on said shaft, a work bracket slidably arranged upon said support, and adapted to move toward and away from said shaft and wheel, a work guide comprising hinged members, one being slidable on said bracket substantially parallel with the axis of said wheel, and the other having a hardened work guide thereon, said members being hinged about an axis substantially transverse to the axis of said wheel and the movement of said bracket toward and away from said wheel, means for adjusting the angle between said members, and means carried by said work guide carrying member for securing a work piece against movement transverse to the plane of said wheel, a pair of strip stock reels on said support, and means for guiding strip material from one reel to said work guides and rest and thence to said other reel.

9. In an apparatus of the class described, a support, a rotatable shaft having a peripheral concentric cutting means thereon, a work table carried on said support, a work guide comprising hinged members, one being slidable on said table and the other having a work rest adapted to hold the work against said cutting means, and means for adjusting the hinged relation of said members to vary the angle of said work rest with respect to the cutting means.

10. In an apparatus of the class described, a support, a rotatable shaft having a peripheral concentric cutting means thereon, a work bracket mounted on said support, and a work guide comprising hinged members, one being slidable on said bracket and the other having a work rest adapted to hold the work against said cutting means, means for adjusting the hinged relation of said members to vary the angle of said work rest with respect to the cutting means, and a work guide adjacent said work rest to fix the position of a work piece transversely with respect to the plane of said peripheral cutting means.

11. In an apparatus of the class described, a support, a rotatable shaft carried thereby, a grinding wheel having a substantially cylindrical grinding face concentrically arranged on said shaft, a work table arranged on said support, a work guide comprising hinged members, one being slidable on said bracket substantially parallel with the axis of said wheel, and the other having a hardened work guide thereon, said members being hinged about an axis substantially transverse to the axis of said wheel, and means for adjusting the angle between said members.

12. In an apparatus of the class described, a support, a rotatable shaft carried thereby, a grinding wheel having a substantially cylindrical grinding face concentrically arranged on said shaft, a work bracket upon said support, a work guide comprising hinged members, one being slidable on said bracket substantially parallel with the axis of said wheel, and the other having a hardened work guide thereon, said members being hinged about an axis substantially transverse to the axis of said wheel and parallel with a tangent to the wheel at the point adjacent the work guide, means for adjusting the angle between said members, and means carried by said work guide carrying member for securing a work piece against movement transverse to the plane of said wheel.

13. In an apparatus of the class described, a support, a pair of rotatable shafts carried thereby, grinding wheels having peripheries adapted to grind plane surfaces, a work bracket associated with each wheel comprising hinged members, a work guide associated with each bracket and having one member movable upon said bracket in a plane substantially parallel to the grinding plane of the respective grinding wheels, the other member hinged about an axis lying in a plane parallel to the grinding plane of the respective grinding wheel and having a hardened work guide thereon, and means for adjusting the angular relation of each of said hinged members.

HOWARD E. SOMES.
FRIEDRICH J. MUELLER.